US012754729B2

(12) United States Patent
Santaus

(10) Patent No.: US 12,754,729 B2
(45) Date of Patent: Oct. 6, 2026

(54) VALIDATED SOFTWARE INSTALLATION AND DEPENDENCY GRAPH

(71) Applicant: Dell Products L.P., Round Rock, TX (US)

(72) Inventor: Benjamin E. Santaus, Somerville, MA (US)

(73) Assignee: Dell Products L.P., Round Rock, TX (US)

( * ) Notice: Subject to any disclaimer, the term of this patent is extended or adjusted under 35 U.S.C. 154(b) by 213 days.

(21) Appl. No.: 18/420,640

(22) Filed: Jan. 23, 2024

(65) Prior Publication Data

US 2025/0238219 A1 Jul. 24, 2025

(51) Int. Cl.
*G06F 8/65* (2018.01)
*G06F 8/61* (2018.01)
*G06F 8/658* (2018.01)
*G06F 8/71* (2018.01)

(52) U.S. Cl.
CPC . *G06F 8/65* (2013.01); *G06F 8/61* (2013.01)

(58) Field of Classification Search
CPC ................. G06F 8/65; G06F 8/61; G06F 8/71
See application file for complete search history.

(56) References Cited

U.S. PATENT DOCUMENTS 7,457,831 B2 * 11/2008 Orleth ................... H04L 63/123 707/999.203
8,627,289 B2 * 1/2014 Farrell ...................... G06F 8/71 717/124
2012/0151468 A1 * 6/2012 Wookey .................. G06F 8/658 717/175
2015/0363195 A1 * 12/2015 Schlueter .................. G06F 8/60 717/121
2017/0060560 A1 * 3/2017 Kumar ....................... G06F 8/65
2017/0374151 A1 * 12/2017 Moorthi .............. H04L 67/5681
2020/0004528 A1 * 1/2020 Pape .......................... G06F 8/65
2022/0222351 A1 * 7/2022 Levin ......................... G06F 8/71
2022/0334820 A1 * 10/2022 R. ........................ G06F 9/44505
2023/0244477 A1 * 8/2023 Moondhra ............ G06F 16/903 717/121
2023/0305827 A1 * 9/2023 Dai ......................... G06F 8/658
2024/0281243 A1 * 8/2024 Francis ..................... G06F 8/65

FOREIGN PATENT DOCUMENTS

CN 115098867 A * 9/2022 ............... G06F 8/65

OTHER PUBLICATIONS https://nixos.org/.

* cited by examiner

*Primary Examiner* — S. Sough
*Assistant Examiner* — Mohammad H Kabir
(74) *Attorney, Agent, or Firm* — Workman Nydegger

(57) ABSTRACT

Techniques for verifying a software package version are disclosed. A new package version for a software package is obtained. A repository maintains package versions for the software package. The new package version includes a new dependency and a new installation instruction for the software package. The repository lists one or more other package versions, each of which includes one or more other dependencies, for the software package. The new dependency and the new installation instruction are verified. In response, the new package version, which includes the new dependency and the new installation instruction, is permitted to be added to the repository, resulting in the software package being associated with the new package version.

17 Claims, 4 Drawing Sheets

300

DAG
200

VALIDATED SOFTWARE INSTALLATION AND DEPENDENCY GRAPH

FIELD OF THE INVENTION

Embodiments of the present invention generally relate to verifying software packages. More particularly, at least some embodiments of the invention relate to systems, hardware, software, computer-readable media, and methods for automatically validating dependencies and installation instructions for new software packages.

BACKGROUND

Creating (or re-creating) a development environment comprised of various tools, libraries, and configurations often involves looking up instructions on how to install each of those constructs. In addition to the instructions for installing those constructs, it is often the case that there is a sequential order to the installation process, such as a scenario where specific dependencies are to be installed prior to other dependencies. One will appreciate how the dependency installation process would generally involve searching up the dependencies' installation instructions as well.

Often, this information (e.g., the information on how to install an arbitrary software package) is scattered across the internet on various websites. As a result, the installation process often involves developers scavenger hunting to find them each time the computing construct is to be installed. Additionally, there are often instances where the provided instructions do not work on the developer's machine. Sometimes, this incompatibility is because of a flaw in the instructions or because of a dependency that is more specific than stated in the instructions. All of these hurdles are unnecessary work that gets repeated on development teams and wastes valuable time.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION

Figure 1:
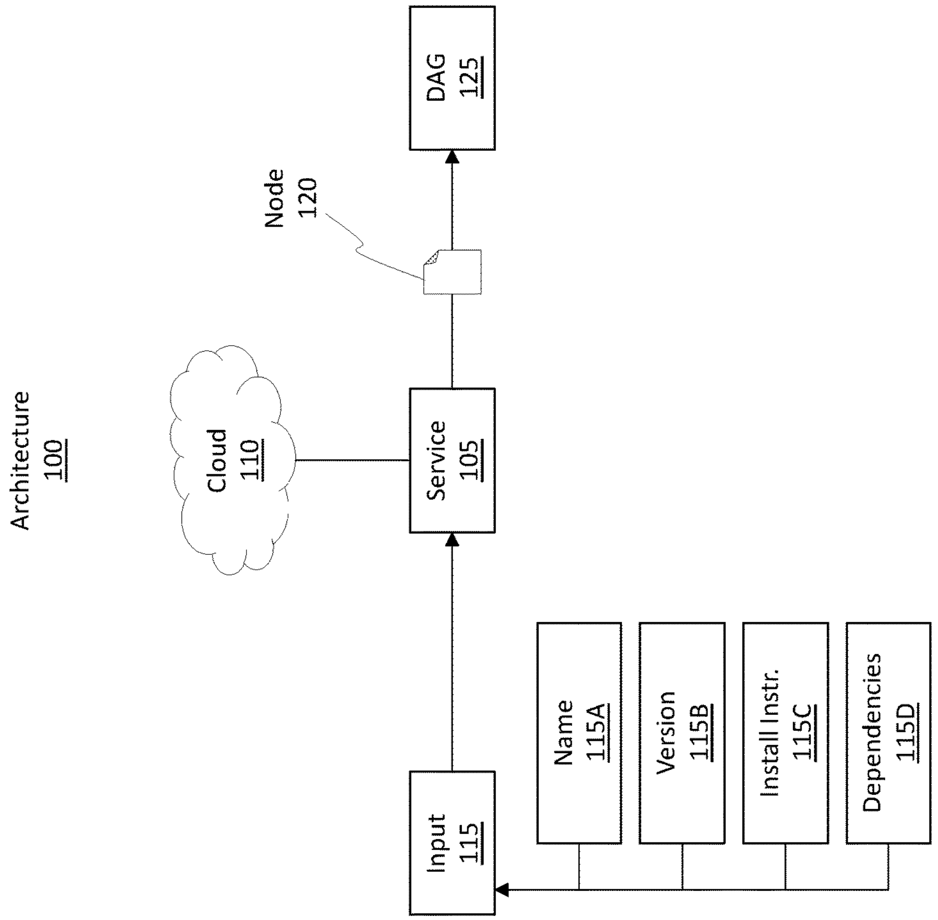
FIG. 1 illustrates an example architecture that may be used to validate the dependencies and installation instructions for a new software package.

"Package managers" are programs that install other programs or collections of software, such as libraries. Some programming languages (e.g., Python) provide a package manager for their language-specific libraries and utilities. Other package managers are responsible for managing system-level packages, such as device drivers, development tools (e.g., editors), and programming languages themselves. Most common operating systems provide a package manager by default; though others have them available for installation.

Developers rely on package managers to collect both the software they want and the dependencies of that software. The default option for installing packages through a package manager is that the dependencies of the software are installed along with it, though users can optionally request that only the target package is installed if they plan on installing the dependencies manually.

In practice, software development involves significantly more tasks than simply writing, running, and testing code. One of those tasks is creating the environment in which the code can be run and tested. Development environments are usually made up of a number of pieces, such as: a programming language (or languages), libraries for that language, device drivers, text editors, and more. When developers set up a development environment, it is often the case that they run a discrete, disparate set of instructions to install all of the various components they need. These instructions are almost always scattered across the internet, usually located with the documentation for the component they are associated with but occasionally sourced from forums or other third-party sites.

When running all of these sets of instructions, it is difficult for developers to also keep track of whether each component's version works with every other component's version. Debugging problems that arise during the install process for tools is one of the least enjoyable parts of writing software. For example, it is almost never clear exactly what the issue is, and resolving the problem can easily consume a large amount of time.

The disclosed embodiments are generally directed to techniques that enable developers to collect and verify installation instructions for various pieces of software so that they can be used confidently in the future. That is, the disclosed embodiments provide a standardized technique in which all dependencies of a software package can be verified and maintained in a repository. Also, it may be the case that a first package (for a given software application) in the repository might reference a first package manager while a second package for that software application might reference a second package manager. Thus, the embodiments are able to coordinate the use of multiple different package managers.

The disclosed embodiments bring about numerous benefits, advantages, and practical applications to the technical field of asset management, and more particularly to installation processes. For instance, using information included within a database, the embodiments are beneficially able to validate any new or updated package dependencies by ensuring that there are no conflicts and that any version of a package listed as a dependency is actually possible to use given the other dependencies. For each valid set of dependencies, the embodiments are beneficially able to run the full set of installation instructions (including dependencies' instructions) and are able to check that the package installs correctly before adding the new information to the database. Different installation instructions for different computing platforms (e.g., operating systems) can also be used and verified.

As another benefit, the embodiments are able to advantageously provide a repository (e.g., the database) where users can add the installation instructions and dependencies for a software package for future reference. This configuration of dependencies (each of which is already present in the repository) and the new installation instructions are then verified to ensure that every combination of the versions of dependencies works and that the install instructions are correct. When this process is complete, the package is added to the repository for use as a dependency by future package installations.

Beneficially, users can take advantage of this system to significantly mitigate the work of re-finding the installation process for packages. Rather than search many sources, developers can visit the repository to get instructions for a single package or many packages, and they can do so with the confidence that the configuration they find has been tested and works. If something fails, the developer can re-run the tests for the failing package and potentially receive some feedback on why the failure occurred. Overall, the system is designed to prevent developers, both alone and part of a team, from having to redo work that has already been done. In this manner, the disclosed embodiments beneficially provide a central, validated repository of information for development teams to reference when they desire to install a package. Accordingly, these and numerous other benefits will now be described in more detail throughout the remaining portions of this disclosure.

Example Architectures

Attention will now be directed to FIG. 1, which illustrates an example architecture 100 in which the disclosed principles may be employed. Architecture 100 shows a service 105.

As used herein, the term "service" refers to an automated program that is tasked with performing different actions based on input. In some cases, service 105 can be a deterministic service that operates fully given a set of inputs and without a randomization factor. In other cases, service 105 can be or can include a machine learning (ML) or artificial intelligence engine. The ML engine enables service 105 to operate even when faced with a randomization factor.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some implementations, service 105 is a cloud service operating in a cloud environment 110. In some implementations, service 105 is a local service operating on a local device. In some implementations, service 105 is a hybrid service that includes a cloud component operating in the cloud and a local component operating on a local device. These two components can communicate with one another.

Service 105 is generally structured to solve a number of problems. For instance, as mentioned earlier, installing software into development environments using a replicable process is often difficult for developers due to the nature of how software is installed on machines. That is, it is often quite challenging to ensure that one developer is running a set of instructions in exactly the same order every time. Searching multiple sites for the correct steps to take naturally results in some variance to the process. If any errors occur during the process, then the set of steps is almost always abandoned or scrambled while the developer attempts to resolve the error. For these reasons, it has historically been hard to standardize the exact software installation process across machines and developers without manually writing scripts to do so.

Another challenge, which service 105 is structured to solve, relates to validation. Validating that the installation instructions for a software package works with varying sets of dependencies is often quite challenging. That is, the process of finding a software package's dependencies is difficult and, at best, tedious. Determining whether or not a given configuration of dependencies will be compatible with a new package is therefore an unappealing task. Often, the easiest option for developers to perform is simply to attempt to install the package without paying any mind to dependencies. Given this, it is hard for developers to determine whether an error in installation is due to the provided instructions having a flaw or whether there is a discrepancy in their machine's configuration. This is one of the underlying causes for the internet trope response of "works on my machine" when someone asks a question about issues in installation.

In an effort to address those challenges, service 105 is generally tasked with obtaining input 115 (e.g., a new package version, optionally from a user) in the form of a new package's name 115A, version 115B, installation instructions 115C, and dependencies 115D. Service 105 then uses that information to add the provided package as a node 120 in a directed acyclic graph (DAG) 125 of dependencies.

That is, graphs are data structures designed to represent relationship between nodes. The "nodes" in the graph are denoted as "vertices" and the "relationships" between two nodes are labeled "edges." Graphs come in many kinds that define different rules for how the vertices and edges must behave. One type of graph is a DAG. A directed graph has edges that have defined "to" and "from" vertices. That is, each edge describes a one-way relationship between two vertices. An acyclic graph is one in which, when beginning at one vertex, one cannot travel along the edges of the graph and arrive back at the same vertex. These data structures define the concept of "dependency" quite well, as circular dependencies are generally hard or impossible to resolve.

In the disclosed DAG 125, each node of the DAG 125 represents one version of a package, and each edge is the source package version's dependency on another version of a package. Notably, service 105 does not allow any unvalidated packages' information to be stored in the DAG 125. Also, service 105 tests each package's installation instructions and dependencies prior to that package being added to the DAG 125.

Figure 2:
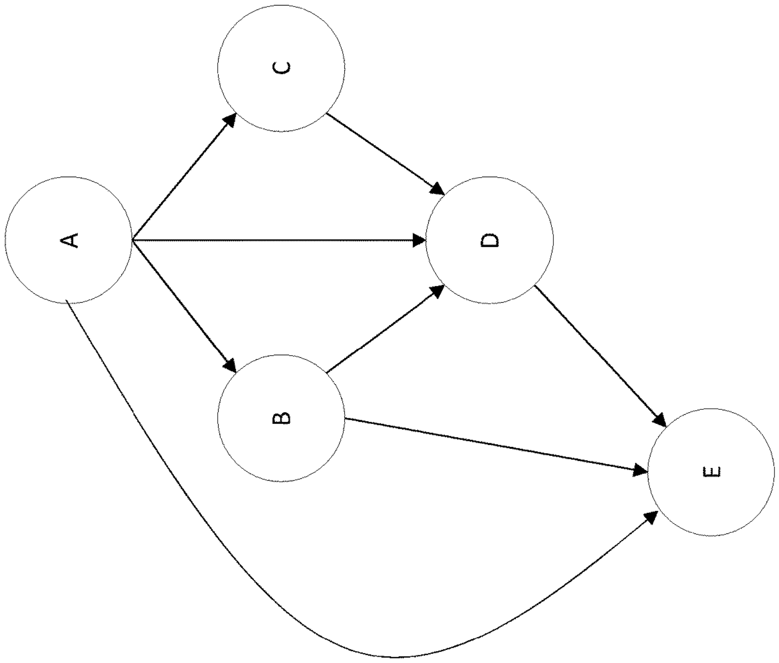
FIG. 2 illustrates an example of a repository in the form of a directed acyclic graph.

Turning briefly to FIG. 2, FIG. 2 shows an example DAG 200 that is representative of the DAG 125. Originally, DAG 200 included four nodes comprising nodes A, B, C, and D. Later, a new node E is added. Node E is added in response to a determination that node E has validated package information, as discussed above and as discussed in more detail below.

Returning to the earlier discussion, the testing for each new package ensures that the installation instructions provided by the user do not trigger an error when run on top of each valid combination of the package's dependencies. Additionally, the service 105's testing for each configuration involves running a test command as a user on the testing machine to ensure that the user can access the tool that was just installed. If all of the various checks pass, service 105 will add the package to the DAG 125 (e.g., a database) along with its dependency relationships. The following disclosure discusses each of the steps service 105 follows more thoroughly as well as some of the use cases for the DAG 125 that gets constructed by service 105.

Dependency Conflict Checking

When a user submits a new package (version) that the user would like to be added to the DAG 125, service 105 instructs the user that the user is also to specify which packages, or rather which other package versions, the new one depends on. If a dependency is missing, service 105 presents the user with two options: either specify the dependency features so that the dependency can be added to the DAG 125 or include the installation of that dependency tool in the instructions for the package the user is installing.

When the list of dependencies reaches the backend, there may be more than one version marked as a dependency per package, which is expected. Service 105's validation process for dependencies is to check that each version marked for a given package is compatible with at least one version of every other package that has been marked. This check is performed for each version listed, since it is possible that version 1 of package A is compatible with version 2 of package B and version 3 of package C, but version 3 of package C is not compatible with version 2 of package B. Notably, determining if two versions are "compatible" involves checking those packages' dependencies against each other to ensure that there is at least one configuration of dependencies for a version of package A that lines up with at least one set from the version of package B.

If a set of two packages' versions are compatible, a tuple containing the version of the first package and the version of the second package is added to a set if there is not already a tuple in the set which contains the same two versions. The set is used in the next step of the process performed by service 105 as a quick reference of which versions of packages were compatible. If it is found that a version of a package has no compatible versions of another package included in the package's information, service 105 will prevent that version from being included in the new package's list of dependencies.

When a conflict is found, service 105 alerts the user to the discrepancy. Service 105 will also abort the request to add the package. If, however, each version passes the check, service 105 proceeds to the following step.

Dependency Combination Collection

The previous step validates that each version of a package present in the submitted configuration from the user can be used in a set of dependencies for the new package. This current step of the process recursively assembles each possible set of dependencies from the selected versions. The recursive function that performs the assembly has the following contract: given (i) a set of compatible package pairs (assembled in the previous step), (ii) a list of package versions, and (iii) a list of "already selected" packages, service 105 returns a list of lists where each member list contains a set of package versions that are compatible with one another and includes the versions in the "already selected" list.

The recursive function's cases are as follows: in the base case, there are no more packages to add to the list of selected packages (i.e. the list of packages that should each have one of their versions represented in the resultant lists). In this case, the function returns a list containing the list of "already selected" packages.

Otherwise, the recursive function (performed by service 105) iterates through the versions of the next package in the list of packages and checks whether any of them are compatible with each of the packages in the "already selected" list. The recursive function performs this step by grabbing each of the tuples from the set of compatible package pairs that include the current version and ensures that each of the packages in the "already selected" list appears in that list.

If so, the recursive function recurses and includes the compatible version in the "already selected" list. The recursive function appends the result(s) of the recursion to a list of valid configurations of packages and returns this list once the iteration through each version of the current package is done. At the completion of the function, service 105 has each of the valid combinations of dependencies for the new package.

Install Verification

After the dependencies have been checked and assembled into each possible non-conflicting configuration, service 105 verifies that the user's submitted instructions actually work on top of those sets of dependencies. In some implementations, service 105 performs this step in a brute force method.

For instance, service 105 uses disposable environments (e.g., such as containers) that contain a bare minimum amount of pre-installed software. Generally, the base environment is based on a single operating system and contains common utilities for downloading packages as well as the native package manager.

For each set of dependencies, service 105 runs the installation instructions for each package and then runs the instructions for the new package on top of that. If there are any errors in this process (either in the installation of the dependencies or the new package), service 105 stops and alerts the user to the problem.

On the other hand, if the installation is successful, service 105 acts as a user in the test environment and runs the validation command the user provided to confirm that the new package installed correctly. Service 105 compares the command's output against any expected output the user provides. If the return code of the command is a predetermined value (e.g., 0) and the expected output is present, service 105 treats the install as a success. Once all of the tests are done and they have all passed, service 105 adds the package's instructions and dependency relationships to its database (e.g., the DAG 125) for future use and alerts the user to the operation's success.

Package and Dependency DAG Use Cases

One, non-limiting use case scenario involves a centralized repository of installation instructions that have been proven to work correctly. Rather than searching the expanse of the internet and potentially incomplete documentation for the steps to install each package a developer might need, that developer can now reference the repository for as many packages as possible and then find the rest. Presumably, once the developer has found the rest, the developer can add them to the repository so that other developers then will not have to repeat that work.

Another non-limiting use case scenario involves generating scripts containing the full set of instructions to install a set of packages rather than just one. Since the dependency information is stored in the repository, the disclosed embodiments can be used to create a script that installs each dependency in the correct order and the packages a developer actually wants.

Yet another non-limiting use case scenario involves using the disclosed database (e.g., the DAG 125) as a repository for team projects or codebases. For instance, rather than describe the dependencies in a README or other format, developers can optionally add software projects to the repository and can check off each of its dependencies. If developers on their team (or elsewhere), then wanted to setup a development environment for that project, they can optionally use the disclosed service 105 to gather the setup instructions. Doing so would save effort on the part of the project originator and would allow the developers to describe the project setup steps without writing the install script themselves.

Additional Aspects

The disclosed repository of validated dependencies and installation instructions can be used for software from varied sources. While some forms of package managers do exist, those package managers work only with software of a specific format. In contrast, the disclosed principles can be employed outside of, and can even leverage, multiple different package managers.

For instance, downgrading a package version to one that is compatible with a software project is problematic. Often, system package managers do not make installing older versions of packages particularly easy or catalog different versions of packages as different packages altogether. The disclosed embodiments coagulate all of this information into a repository that developers can populate themselves to alleviate the future burden of rediscovering how a given package is installed.

The disclosed embodiments also beneficially relate to the automated validation of package installation instructions for every set of validated software dependencies. Though software often lists its dependencies, users of that software have had to rely on the publisher's trustworthiness and diligence in determining if that list is accurate.

At present, the available methods for validating that software installs correctly are limited, and the most common way is simply to do it. Automating this process of installing the package on top of different sets of dependencies, each of which has also been validated, is a solution to that problem. The result of this process is a directed acyclic graph in which each node can be used to find a valid configuration of packages based on a user's needs.

The disclosed embodiments are additionally helpful if a previously validated package (or configuration of packages) stops working. The validation process can be re-run to determine where the issue resides, and if it is necessary, the offending package's instructions or dependencies can be modified or removed.

The disclosed embodiments are also beneficially related to the automated aggregation of package installation instructions with dependencies' instructions. For instance, traversing the breadth of the internet to collect sets of installation instructions for software tools is often a waste of developer time. The repository of software packages described in this disclosure is able to subvert (e.g., once a package is added to it) this time sink in favor of providing a compiled list of instructions to install a set of packages.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
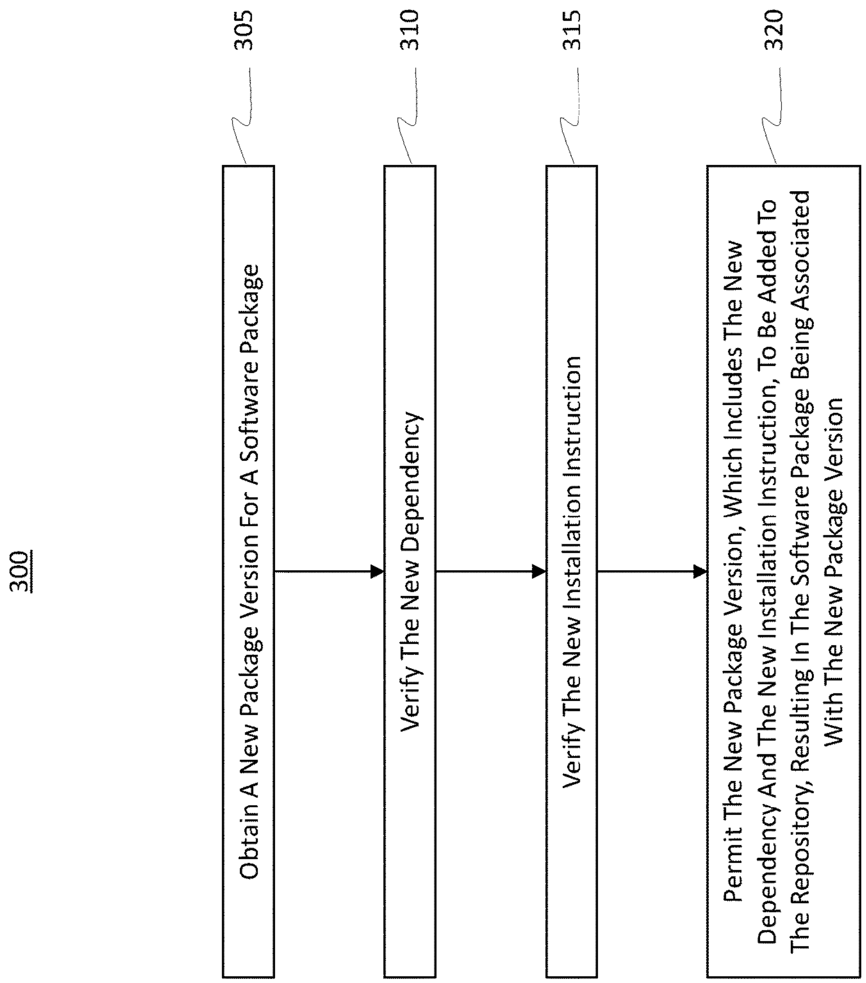
FIG. 3 illustrates a flowchart of an example method for validating new software package versions.

Attention will now be directed to FIG. 3, which illustrates a flowchart of an example method 300 for validating a new software package. Method 300 can be implemented within the architecture 100 of FIG. 1. Method 300 can be performed by service 105 of FIG. 1.

Method 300 includes an act (act 305) of obtaining a new package version for a software package. Notably, a repository maintains package versions for the software package. Also, the new package version includes a new dependency and a new installation instruction for the software package. The repository lists one or more other package versions, each of which includes one or more other dependencies, for the software package. Optionally, the repository may be implemented as a directed acyclic graph.

In some cases, the new package version includes a name for the new package version. The new package version may also include version information for the new package version. Optionally, the new package version may include information specifying which other packages (or package versions) the new package version depends on.

Act 310 includes verifying the new dependency. This verification is performed by determining whether the new dependency is compatible with the one or more other dependencies for the software package. In some implementations, the process of determining whether the new dependency is compatible with the one or more other dependencies includes determining whether every combination of the new dependency and the one or more other dependencies is operational with each other. In some cases, the process of determining whether the new dependency is compatible with the one or more other dependencies includes recursively assembling each possible set of dependencies from the one or more other package versions.

Act 315 includes verifying the new installation instruction. This verification is performed by executing the new installation instruction to determine whether that execution results in a successful installation event, such as an event where the new package version is successfully installed. The process of executing the new installation instruction may include running a test command as a user on a testing machine. Optionally, the process of verifying the new installation instruction includes verifying that the new installation instruction works using the new dependency. In some implementations, the process of executing the new installation instruction is performed within a container computing environment. As another option, the process of executing the new installation instruction may be performed by executing a corresponding installation instruction for the one or more other package versions and then executing the new installation instruction for the new package version.

In response to determining that the new dependency is compatible with the one or more other dependencies and in response to determining that the execution results in the successful installation of that new package version (and dependencies), act 320 includes permitting the new package version, which includes the new dependency and the new installation instruction, to be added to the repository. As a result, the software package is now associated with the new package version.

On the other hand, in response to determining that the new dependency is not compatible with the one or more other dependencies or in response to determining that the execution does not result in the successful installation of the new package version, the new package version is prohibited from being added to the repository.

Accordingly, the disclosed embodiments beneficially make getting started on development easier and reduce the burden on developers to have to search the internet for disparate sets of installation instructions. The disclosed embodiments can be presented as a tool for teams to manage their common software utilities in a central location in addition to taking the hardware management effort out of their hands.

Optionally, the disclosed embodiments can be incorporated into a web application designed to provide users with custom development containers. For example, users are able to select from a list of software packages and receive a container with those tools installed. The embodiments are able to continually manage and update that listing of software packages. Therefore, the user interface by which developers might add new packages to the listing or update an existing package's information is available as a page (e.g., perhaps an "Add Package" page) in the larger application. This page may optionally contain two main components: a form where the user is able to input the necessary information about the package (e.g., name, version, dependencies, install instructions, and verification command/output) and an output window where updates from the backend service are displayed. Users are able to fill in their information, submit their configuration, and watch as the backend tests the dependencies and instructions.

The backend functionality is run when a user request reaches the web server hosting the application. At that point, a thread may be created to run the package testing process in the background. The web application can poll the backend for updates from this thread on a set interval until the process either succeeds or fails. These updates may then be shown in the output window of the user interface.

In another example embodiment, instead of running the instructions inside a running container, some embodiments run them as steps in the process of building the container image. More specifically, the instructions can optionally be placed into a Dockerfile, and that file can then be used to build a container image. Additionally, the disclosed service can build one Docker container image per package that has to be installed, and that container may include the images build on top of each other.

Some embodiments are configured to optionally take three different sets of instructions per package. As context, the disclosed service can optionally deliver containers to users that contain a preconfigured user account for the requester. To do this, the service builds the container image first, then runs a series of steps to copy a user's configuration files into the container, and then adds them as a user. This means that all of the installs run during the build process as the root user and some additional work done may be performed to make sure that the added user account has access to the tools. To fulfill this purpose, the embodiments may request three different sets of instructions, two of which are optional.

The first set is the "install" instructions step, which performs the downloading and installing of the package. The second set has "initialization" instructions, which run as the user account during the last step of the container build process and do one-time configurations, such as moving files so that users can access the tools.

The second set contains "login" instructions, which run as the user account every time the user logs into the container. These instructions may also be used to set parameters, such as environment variables.

Example Computers/Computer Systems

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. Also, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, client, engine, agent, services, and component are examples of terms that may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
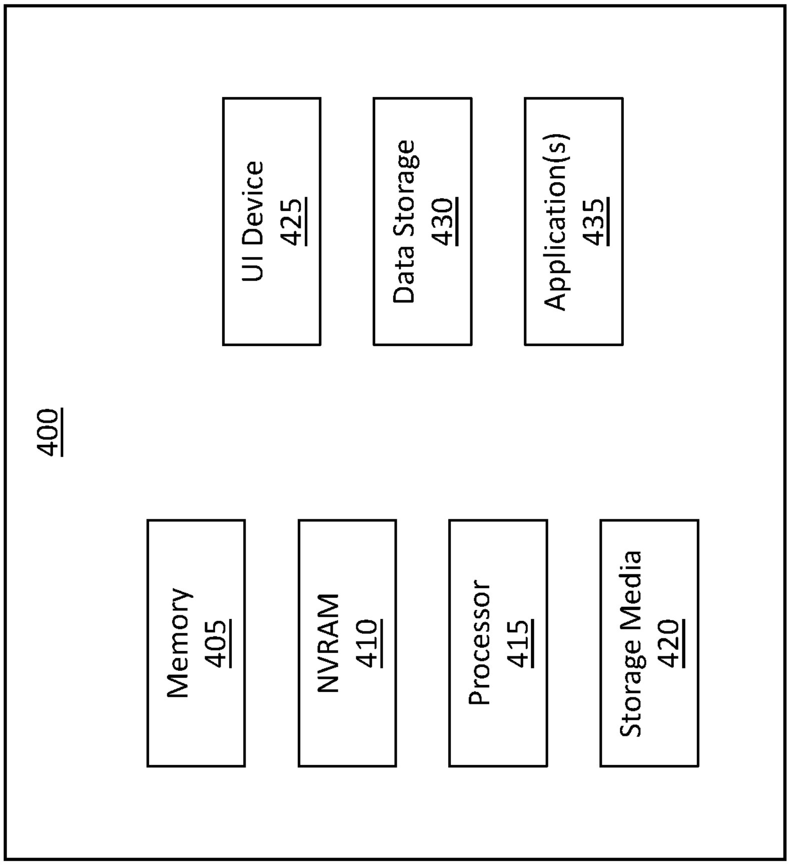
FIG. 4 illustrates an example computer system that can be configured to perform any of the disclosed operations.

With reference briefly now to FIG. 4, any one or more of the entities disclosed, or implied, by the Figures and/or elsewhere herein, may take the form of, or include, or be implemented on, or hosted by, a physical computing device, one example of which is denoted at 400. Also, where any of the aforementioned elements comprise or consist of a virtual machine (VM), that VM may constitute a virtualization of any combination of the physical components disclosed in FIG. 4.

In the example of FIG. 4, the physical computing device 400 includes a memory 405 which may include one, some, or all, of random access memory (RAM), non-volatile memory (NVM) 410 such as NVRAM for example, read-only memory (ROM), and persistent memory, one or more hardware processors 415, non-transitory storage media 420, UI device 425, and data storage 430. One or more of the memory 405 of the physical computing device 400 may take the form of solid-state device (SSD) storage. Also, one or more applications 435 may be provided that comprise instructions executable by one or more hardware processors 415 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein. The physical device 400 may also be representative of an edge system, a cloud-based system, a datacenter or portion thereof, or other system or entity.

The disclosed embodiments can be implemented in numerous different ways, as described in the various different clauses recited below.

Clause 1. A method, comprising: obtaining a new package version for a software package, wherein a repository maintains package versions for the software package, wherein the new package version includes a new dependency and a new installation instruction for the software package, and wherein the repository lists one or more other package versions, each of which includes one or more other dependencies, for the software package; verifying the new dependency by determining whether the new dependency is compatible with the one or more other dependencies for the software package; verifying the new installation instruction by executing the new installation instruction to determine whether said execution results in a successful installation; and in response to determining that the new dependency is compatible with the one or more other dependencies and in response to determining that said execution results in the successful installation, permitting the new package version, which includes the new dependency and the new installation instruction, to be added to the repository, resulting in the software package being associated with the new package version.

Clause 2. The method of any of the preceding clauses, wherein determining whether the new dependency is compatible with the one or more other dependencies includes determining whether every combination of the new dependency and the one or more other dependencies is operational with each other.

Clause 3. The method of any of the preceding clauses, wherein the repository is implemented as a directed acyclic graph.

Clause 4. The method of any of the preceding clauses, wherein, in response to determining that the new dependency is not compatible with the one or more other dependencies or in response to determining that said execution does not result in the successful installation, the new package version is prohibited from being added to the repository.

Clause 5. The method of any of the preceding clauses, wherein the new package version includes a name for the new package version.

Clause 6. The method of any of the preceding clauses, wherein the new package version includes version information for the new package version.

Clause 7. The method of any of the preceding clauses, wherein executing the new installation instruction includes running a test command as a user on a testing machine.

Clause 8. The method of any of the preceding clauses, wherein the new package version includes information specifying which packages the new package version depends on.

Clause 9. One or more hardware storage devices that store instructions that are executable by one or more processors to cause the one or more processors to: obtain a new package version for a software package, wherein a repository maintains package versions for the software package, wherein the new package version includes a new dependency and a new installation instruction for the software package, and wherein the repository lists one or more other package versions, each of which includes one or more other dependencies, for the software package; verify the new dependency by determining whether the new dependency is compatible with the one or more other dependencies for the software package; verify the new installation instruction by executing the new installation instruction to determine whether said execution results in a successful installation; and in response to determining that the new dependency is compatible with the one or more other dependencies and in response to determining that said execution results in the successful installation, permit the new package version, which includes the new dependency and the new installation instruction, to be added to the repository, resulting in the software package being associated with the new package version.

Clause 10. The one or more hardware storage devices of any of the preceding clauses, wherein determining whether the new dependency is compatible with the one or more other dependencies includes recursively assembling each possible set of dependencies from the one or more other package versions.

Clause 11. The one or more hardware storage devices of any of the preceding clauses, wherein verifying the new installation instruction includes verifying that the new installation instruction works using the new dependency.

Clause 12. The one or more hardware storage devices of any of the preceding clauses, wherein executing the new installation instruction is performed within a container computing environment.

Clause 13. The one or more hardware storage devices of any of the preceding clauses, wherein executing the new installation instruction is performed by executing a corresponding installation instruction for the one or more other package versions and then executing the new installation instruction for the new package version.

Clause 14. The one or more hardware storage devices of any of the preceding clauses, wherein the repository is implemented as a directed acyclic graph.

Clause 15. The one or more hardware storage devices of any of the preceding clauses, wherein, in response to determining that the new dependency is not compatible with the one or more other dependencies or in response to determining that said execution does not result in the successful installation, the new package version is prohibited from being added to the repository.

Clause 16. A computer system comprising: one or more processors; and one or more hardware storage devices that store instructions that are executable by the one or more processors to cause the computer system to: obtain a new package version for a software package, wherein a repository maintains package versions for the software package, wherein the new package version includes a new dependency and a new installation instruction for the software package, and wherein the repository lists one or more other package versions, each of which includes one or more other dependencies, for the software package; verify the new dependency by determining whether the new dependency is compatible with the one or more other dependencies for the software package; verify the new installation instruction by executing the new installation instruction to determine whether said execution results in a successful installation; and in response to determining that the new dependency is compatible with the one or more other dependencies and in response to determining that said execution results in the successful installation, permit the new package version, which includes the new dependency and the new installation instruction, to be added to the repository, resulting in the software package being associated with the new package version.

Clause 17. The computer system of any of the preceding clauses, wherein, in response to determining that the new dependency is not compatible with the one or more other dependencies or in response to determining that said execution does not result in the successful installation, the new package version is prohibited from being added to the repository.

Clause 18. The computer system of any of the preceding clauses, wherein the new package version includes a name for the new package version.

Clause 19. The computer system of any of the preceding clauses, wherein the new package version includes version information for the new package version.

Clause 20. The computer system of any of the preceding clauses, wherein executing the new installation instruction includes running a test command as a user on a testing machine.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

obtaining a new package version for a software package, wherein a repository maintains package versions for the software package, wherein the new package version includes a new dependency and a new installation instruction for the software package, and wherein the repository lists one or more other package versions, each of which includes one or more other dependencies, for the software package;

verifying the new dependency by constructing, using one or more processors, a plurality of dependency-specific installation environments based on combinations of the one or more other dependencies and the new dependency;

verifying the new installation instruction by executing, within each of the plurality of dependency-specific installation environments, the new installation instruction to produce a corresponding installation result reflecting interaction between the new dependency and the one or more other dependencies;

in response to detecting, from the installation results, at least one dependency-specific installation environment in which execution of the new installation instruction completes without a dependency conflict or installation failure, permitting the new package version, which includes the new dependency and the new installation instruction, to be added to the repository, resulting in the software package being associated with the new package version; and in response to detecting that none of the plurality of dependency-specific installation environments produces a successful installation result, preventing the new package version from being added to the repository, wherein constructing the plurality of dependency-specific installation environments includes:

recursively assembling every possible set of dependencies from the one or more other package versions in the repository; and recursively generating and updating a list of software package versions that are compatible with the new package version, wherein each dependency-specific installation environment comprises an isolated file system state and dependency configuration generated from the repository to emulate installation of the new package version under a corresponding dependency set, and wherein compatibility of the new dependency with the one or more other dependencies is determined based on the installation results rather than solely on dependency metadata.

2. The method of claim 1, wherein determining whether the new dependency is compatible with the one or more other dependencies includes determining whether every combination of the new dependency and the one or more other dependencies is operational with each other.

3. The method of claim 1, wherein the repository is implemented as a directed acyclic graph.

4. The method of claim 1, wherein the new package version includes a name for the new package version.

5. The method of claim 1, wherein the new package version includes version information for the new package version.

6. The method of claim 1, wherein executing the new installation instruction includes running a test command as a user on a testing machine.

7. The method of claim 1, wherein the new package version includes information specifying which packages the new package version depends on.

8. One or more hardware storage devices that store instructions that are executable by one or more processors to cause the one or more processors to:

obtain a new package version for a software package, wherein a repository maintains package versions for the software package, wherein the new package version includes a new dependency and a new installation instruction for the software package, and wherein the repository lists one or more other package versions, each of which includes one or more other dependencies, for the software package;

verify the new dependency by constructing a plurality of dependency-specific installation environments corresponding to combinations of the one or more other dependencies and the new dependency, each dependency-specific installation environment comprising an isolated dependency configuration derived from the repository;

verify the new installation instruction by executing the new installation instruction within each of the plurality of dependency-specific installation environments to generate installation results corresponding to each dependency-specific installation environment;

in response to detecting, from the installation results, at least one dependency-specific installation environment in which execution of the new installation instruction completes without a dependency conflict or installation failure, permit the new package version, which includes the new dependency and the new installation instruction, to be added to the repository, resulting in the software package being associated with the new package version; and in response to detecting that none of the plurality of dependency-specific installation environments produces a successful installation result, preventing the new package version from being added to the repository, wherein constructing the plurality of dependency-specific installation environments includes:

recursively assembling every possible set of dependencies from the one or more other package versions in the repository; and recursively generating and updating a list of software package versions that are compatible with the new package version, wherein compatibility of the new dependency with the one or more other dependencies is determined based on the installation results generated by execution of the new installation instruction within the plurality of dependency-specific installation environments rather than solely on dependency metadata.

9. The one or more hardware storage devices of claim 8, wherein determining whether the new dependency is compatible with the one or more other dependencies includes recursively assembling each possible set of dependencies from the one or more other package versions.

10. The one or more hardware storage devices of claim 8, wherein verifying the new installation instruction includes verifying that the new installation instruction works using the new dependency.

11. The one or more hardware storage devices of claim 8, wherein executing the new installation instruction is performed within a container computing environment.

12. The one or more hardware storage devices of claim 8, wherein executing the new installation instruction is performed by executing a corresponding installation instruction for the one or more other package versions and then executing the new installation instruction for the new package version.

13. The one or more hardware storage devices of claim 8, wherein the repository is implemented as a directed acyclic graph.

14. A computer system comprising:

one or more processors; and one or more hardware storage devices that store instructions that are executable by the one or more processors to cause the computer system to:

obtain a new package version for a software package, wherein a repository maintains package versions for the software package, wherein the new package version includes a new dependency and a new installation instruction for the software package, and wherein the repository lists one or more other package versions, each of which includes one or more other dependencies, for the software package;

verify the new dependency by generating a plurality of dependency-specific installation environments, each dependency-specific installation environment corresponding to a distinct combination of the one or more other dependencies and the new dependency and comprising an isolated dependency configuration derived from the repository;

verify the new installation instruction by executing the new installation instruction within each of the plurality of dependency-specific installation environments to produce installation outcomes indicative of interactions between the new dependency and the one or more other dependencies; and in response to detecting, from the installation outcomes, at least one dependency-specific installation environment in which execution of the new installation instruction completes without a dependency conflict or installation failure, permit the new package version, which includes the new dependency and the new installation instruction, to be added to the repository, resulting in the software package being associated with the new package version; and in response to detecting that the installation outcomes indicate failure across the plurality of dependency-specific installation environments, preventing the new package version from being added to the repository, wherein generating the plurality of dependency-specific installation environments includes:

recursively assembling every possible set of dependencies from the one or more other package versions in the repository; and recursively generating and updating a list of software package versions that are compatible with the new package version, wherein the computer system is configured to determine compatibility of the new dependency with the one or more other dependencies based on the installation outcomes produced by execution within the plurality of dependency-specific installation environments rather than solely on dependency metadata.

15. The computer system of claim 14, wherein the new package version includes a name for the new package version.

16. The computer system of claim 14, wherein the new package version includes version information for the new package version.

17. The computer system of claim 14, wherein executing the new installation instruction includes running a test command as a user on a testing machine.

* * * * *